United States Patent
Matsusue et al.

(10) Patent No.: US 8,580,447 B2
(45) Date of Patent: Nov. 12, 2013

(54) FUEL CELL SYSTEM AND CONTROL METHOD FOR THE SAME

(75) Inventors: Masaaki Matsusue, Mishima (JP); Yuri Shindo, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/642,044

(22) PCT Filed: Apr. 6, 2011

(86) PCT No.: PCT/IB2011/000739
§ 371 (c)(1),
(2), (4) Date: Oct. 18, 2012

(87) PCT Pub. No.: WO2011/132044
PCT Pub. Date: Oct. 27, 2011

(65) Prior Publication Data
US 2013/0040217 A1    Feb. 14, 2013

(30) Foreign Application Priority Data
Apr. 19, 2010  (JP) ................................. 2010-096341

(51) Int. Cl.
*H01M 8/06*    (2006.01)
(52) U.S. Cl.
USPC ....................................................... 429/427
(58) Field of Classification Search
None
See application file for complete search history.

(56) References Cited

U.S. PATENT DOCUMENTS

| | | | | |
|---|---|---|---|---|
| 2001/0028970 A1* | 10/2001 | Sano et al. | ...................... | 429/22 |
| 2003/0072980 A1* | 4/2003 | Formanski et al. | ............. | 429/13 |
| 2007/0248857 A1* | 10/2007 | Kurosawa | ....................... | 429/22 |

FOREIGN PATENT DOCUMENTS

| | | |
|---|---|---|
| JP | 10-340734 A | 12/1998 |
| JP | 2000-251913 A | 9/2000 |
| JP | 2007-265956 A | 10/2007 |
| JP | 2008-021448 A | 1/2008 |
| JP | 2009-193817 A | 8/2009 |
| WO | 2008/017946 A2 | 2/2008 |

OTHER PUBLICATIONS

International Search Report & Written Opinion of PCT/IB2011/000739 mailed Aug. 11, 2011.
International Preliminary Report on Patentability of PCT/IB2011/000739 dated Jul. 2, 2012.

* cited by examiner

*Primary Examiner* — Patrick Ryan
*Assistant Examiner* — Jose Colucci Rios
(74) *Attorney, Agent, or Firm* — Kenyon & Kenyon LLP (57) ABSTRACT

An ECU estimates a dispersion among wet states of cells arranged in a lamination direction of a fuel cell. When it is determined that the dispersion among the wet states is equal to or exceed a threshold, the ECU controls a flow rate of a coolant, flow rates of gases, and pressures of gases to suppress the dispersion among the wet states below the threshold. The ECU controls the flow rate of the coolant with higher priority than the other parameters.

7 Claims, 5 Drawing Sheets

FIG.6

FUEL CELL SYSTEM AND CONTROL METHOD FOR THE SAME

This is a 371 national phase application of PCT/IB2011/000739 filed 6 Apr. 2011, claiming priority to Japanese Patent Application No. 2010-096341 filed 19 Apr. 2010, the contents of which are incorporated herein by reference.

FIELD OF THE INVENTION

1. Field of the Invention

The invention relates to a fuel cell system and a control method for the same, and more particularly, to the suppression of the dispersion among wet states in a stack lamination direction.

2. Background of the Invention

There is known a fuel cell system equipped with a fuel cell that has a fuel electrode to which a fuel gas is supplied and an oxidant electrode to which an oxidizing gas is supplied, and causes these gases to electrochemically react with each other to generate electricity.

According to what is disclosed in Japanese Patent Application Publication No. 10-340734 (JP-A-10-340734), a distribution of temperatures in a fuel cell is detected, and coolant control means is controlled to increase an amount of a coolant supplied to the fuel cell per unit time when it is determined that the distribution of the temperatures is in a predetermined inhomogeneous state. The distribution of the temperatures is obtained by detecting a difference between a temperature of the coolant flowing into the fuel cell and a temperature of the coolant discharged from the fuel cell.

According to what is disclosed in Japanese Patent Application Publication No. 2008-21448 (JP-A-2008-21448), a dispersion among wet states of cells constituting a stack is detected, and the control of humidifying a fuel cell is performed when a certain one of the cells is drier than another one of the cells by a predetermined level or more. More specifically, a fuel gas humidifier and an oxidizing gas humidifier are controlled to increase amounts of humidification of a fuel gas and an oxidizing gas that are supplied to the fuel cell above a normal level.

According to what is disclosed in Japanese Patent Application Publication No. 2009-193817 (JP-A-2009-193817), a bias state of moisture is estimated from a difference between voltages measured at different measurement points of a fuel cell, and then controlled by adjusting at least one of a humidity of each gas supplied to the fuel cell, a flow rate of each gas, and a pressure of each gas.

Incidentally, a manifold that supplies/discharges a coolant or a fuel gas/an oxidizing gas to/from each of cells of a fuel cell cannot be increased in size beyond necessity due to restrictions on the size and weight for mounting in the case where the fuel cell is mounted on a mobile object such as a vehicle or the like. Further, considering the discharge of the moisture in the manifold and the like, the diameter of the manifold needs to be rather small to ensure a certain flow rate in the manifold. In this manifold and each of the cells connected thereto, the influence of a pressure loss of an internal fluid is more remarkable than in the case where there is no restriction on the size of the manifold or the like. Due to this pressure loss, the distribution of the coolant and the fuel gas/the oxidizing gas is more likely to be dispersed. This dispersion of the distribution leads to a difference in the amount of the moisture taken away by the gases, a difference in the flow rate of the coolant, and a distribution of temperatures among the cells. Thus, the dispersion among wet states of the cells occurs in a lamination direction of a stack of the fuel cell, and hence may cause a decrease in the voltage of each of the cells, a limitation on output, and the like.

As disclosed in Japanese Patent Application Publication No. 2009-193817 (JP-A-2009-193817), the Wet states can be controlled to some extent by adjusting the humidity of the gases, the flow rate of the gases, and the pressure of the gases. However, there have been demands for an art for more efficiently suppressing the dispersion among the wet states.

SUMMARY OF THE INVENTION

The invention provides a fuel cell system that suppresses the dispersion among wet states resulting from the dispersion of the distribution of a coolant and a fuel gas/and an oxidizing gas which is caused by a pressure loss of an internal fluid resulting from a manifold that supplies and discharges a cooling medium and the fuel gas/the oxidizing gas, and a control method for the fuel cell system.

A first aspect of the invention relates to a fuel cell system. This fuel cell system is equipped with a fuel cell that generates electricity through an electrochemical reaction between a fuel gas and an oxidizing gas and is constituted by a laminated stack of unit cells, detection means for detecting a dispersion among wet states of cells arranged in a lamination direction of the unit cells, and control means for suppressing the dispersion among the wet states by controlling a flow rate of a cooling medium for cooling the unit cells when the dispersion among the wet states is equal to or exceed a threshold.

The control means may further control at least one of gas flow rates of the fuel gas and the oxidizing gas and gas pressures of the fuel gas and the oxidizing gas.

The control means may perform control such that a humidity of that one of the unit cells arranged in the lamination direction of the fuel cell which is located on an inlet side of the fuel gas, the oxidizing gas, and the cooling medium and a humidity of an end cell located opposite that cell on the inlet side become equal to each other.

A second aspect of the invention relates to a control method for a fuel cell system. The fuel cell system is equipped with a fuel cell that generates electricity through an electrochemical reaction between a fuel gas and an oxidizing gas and is constituted by a laminated stack of unit cells. This control method includes (a) detecting a dispersion among wet states of the unit cells arranged in a lamination direction of the unit cells, and (b) suppressing the dispersion among the wet states by controlling a flow rate of a cooling medium for cooling the unit cells when the dispersion among the wet states is equal to or exceed a threshold. The (b) is repeatedly carried out until the dispersion among the wet states becomes smaller than the threshold.

The (b) may further include controlling at least one of gas flow rates of the fuel gas and the oxidizing gas and gas pressures of the fuel gas and the oxidizing gas.

The (b) may include determining whether or not a current flow rate of the cooling medium is lower than a maximum permissible flow rate, and controlling the flow rate of the cooling medium when it is determined that the current flow rate of the cooling medium is lower than the maximum permissible flow rate and controlling at least one of gas flow rates of the fuel gas and the oxidizing gas and gas pressures of the fuel gas and the oxidizing gas when it is determined that the current flow rate of the cooling medium has reached the maximum pen permissible flow rate.

The fuel cell system and the control method for the same according to the respective aspects of the invention can suppress the dispersion among the wet states resulting from the dispersion of the distribution of the coolant and the fuel gas/the oxidizing gas which is caused by a pressure loss of the manifold that supplies and discharges the cooling medium and the fuel gas/the oxidizing gas.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements and wherein.

DETAILED DESCRIPTION OF THE EMBODIMENT

The embodiment of the invention will be described hereinafter on the basis of the drawings.

Figure 1:
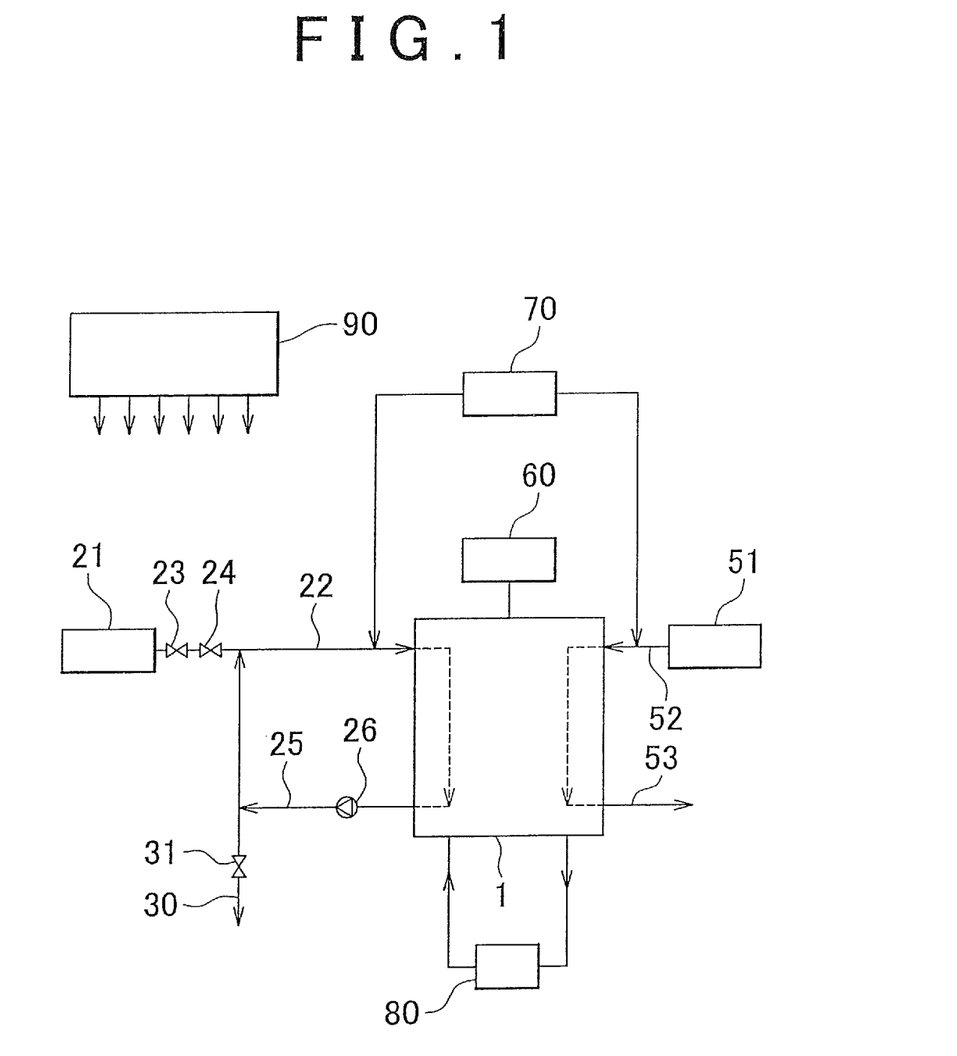
FIG. 1 is a schematic view of a fuel cell system according to the embodiment of the invention.

A basic configuration of a fuel cell system will be described. FIG. 1 shows the configuration of the fuel cell system. The fuel cell system is equipped with a fuel cell 1, a gas tank 21 for storing a fuel gas, a fuel gas passage 22, a circulation passage 25, a fuel off gas passage 30, an air blower 51, an oxidizing gas passage 52, an oxidation off gas passage 53, a measuring device 60, a humidifier 70, a coolant supply portion 80, and an electronic control unit (an ECU) 90. The fuel cell system generates electricity by causing an electrochemical reaction between the fuel gas supplied from the gas tank 21 through the fuel gas passage 22 and an oxidizing gas supplied from the air blower 51 through the oxidizing gas passage 52 to proceed within the fuel cell 1.

The fuel gas passage 22 is provided with a pressure reducing valve 23 and a flow rate control valve 24. The fuel gas supplied from the gas tank 21 to the fuel cell 1 is depressurized to a predetermined pressure by the pressure reducing valve 23, adjusted in flow rate by the flow rate control valve 24, and supplied to the fuel cell 1 through the fuel gas passage 22. The fuel gas that has flowed through the interior of the fuel cell 1 is discharged to the circulation passage 25.

The circulation passage 25 is provided with a circulation pump 26. The circulation pump 26 can return the fuel gas discharged from the fuel cell 1 to the fuel gas passage 22, and increase the flow rate of the fuel gas supplied to the fuel cell 1 per unit time. The fuel off gas passage 30 is provided with a purge valve 31. The fuel gas decreases in the concentration of the gas contained therein (the concentration of hydrogen gas) through circulation. Therefore, the purge valve 31 is controlled to discharge a fuel off gas with low gas concentration from the circulation passage 25 to the fuel off gas passage 30, and the flow rate control valve 24 is controlled to supply the fuel gas with high gas concentration from the gas tank 21.

The measuring device 60 measures various states, such as voltages and the like, of respective cells of the fuel cell 1. The voltages and the like of the respective cells measured by the measuring device 60 are supplied to the ECU 90.

The coolant supply portion 80 supplies in a circulatory manner the coolant to the fuel cell 1. The coolant supply portion 80 is equipped with a circulation pump and a radiator. For example, an antifreeze such as ethylene glycol or the like is used as the coolant.

The ECU 90 controls the entire fuel cell system. The ECU 90 controls the purge valve 31, the pressure reducing valve 23, and the flow rate control valve 24. On the basis of the wet state in the fuel cell, the ECU 90 controls these valves such that the generation efficiency of the fuel cell is optimized. More specifically, the ECU 90 makes a determination on the dispersion among wet states in the lamination direction of the stack of the fuel cell 1, on the basis of the voltages and the like of the respective cells detected by the measuring device 60, and adjusts the flow rate of the coolant, the flow rates of the gases, and the pressures of the gases to suppress or eliminate the dispersion among the wet states in accordance with the result of this determination. The details of the method of adjustment will be described later.

Figure 2:
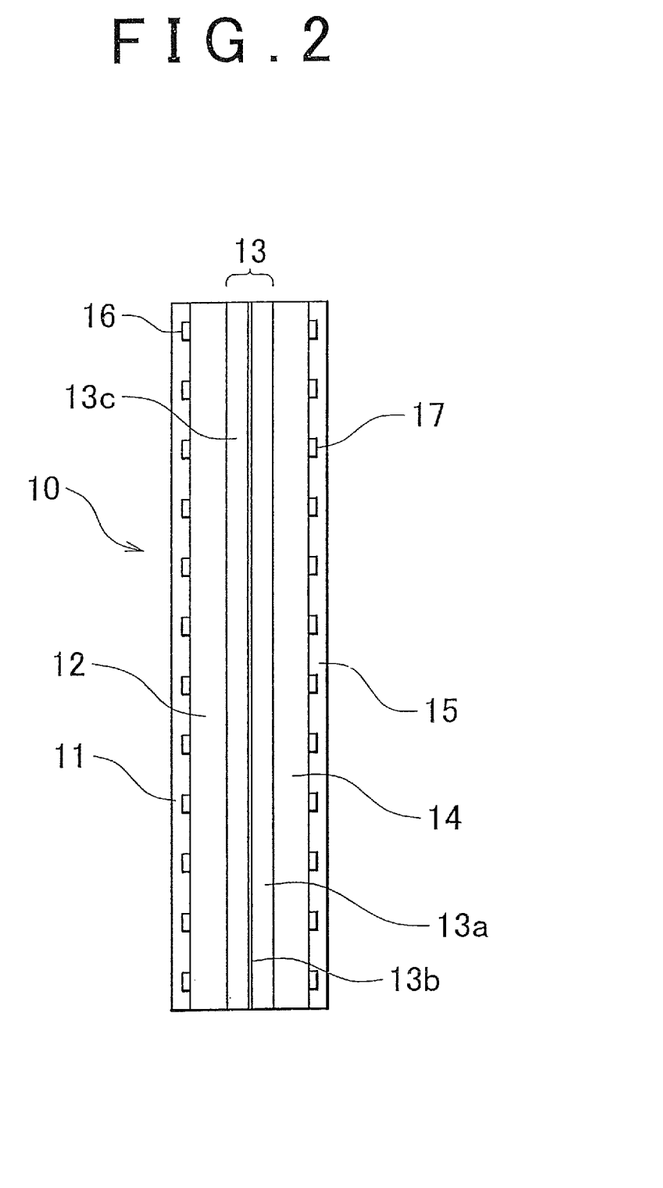
FIG. 2 is a schematic view of each cell of the fuel cell system according to the embodiment of the invention.

FIG. 2 shows a cross-section of each of the cells constituting the fuel cell 1. The fuel cell 1 is equipped with a stack constituted by laminating a plurality of cells 10 on one another. Each of the cells 10 is constructed by sequentially laminating a cathode-side separator 11 having in an inner face thereof an oxidizing gas flow channel (an oxidizing gas manifold) 16 and a coolant flow channel (a coolant manifold), a cathode-side gas diffusion layer 12, a membrane electrode assembly (MEA) 13, an anode-side gas diffusion layer 14, and an anode-side separator 15 having in an inner face thereof a fuel gas flow channel (a fuel gas manifold) 17 and a coolant flow channel (a coolant manifold). The fuel cell 1 causes an electrochemical reaction between supplied reactive gases to proceed in each membrane electrode assembly 13 constructed by laminating a cathode-side catalytic layer 13c, an electrolyte membrane 13b, and an anode-side catalytic layer 13a on one another, thereby generating electricity. The oxidizing gas is supplied to the cathode-side gas diffusion layer 12, and the fuel gas is supplied to the anode-side gas diffusion layer 14. It should be noted that the oxidizing gas and the fuel gas are diffused to the gas diffusion layers through flow channels windingly formed in the faces of the respective cells, and that the oxidizing gas flow channel 16 and the fuel gas flow channel 17 are arranged such that the oxidizing gas and the fuel gas flow in opposed directions.

In this construction, the oxidizing gas flow channel 16, the cathode-side gas diffusion layer 12, the fuel gas flow channel 17, and the anode-side gas diffusion layer 14 are shaped such that the oxidizing gas and the fuel gas are homogeneously diffused to the membrane electrode assembly (the MEA) 13. However, as described already, the gases flowing through the respective flow channels suffer a pressure loss, and hence are inhomogeneously diffused. Thus, the wet states of the respective cells in the lamination direction of the stack are dispersed. More specifically, the stack is sandwiched between end plates provided at both ends respectively. The gases are supplied from one end (a supply/discharge end) and distributed to all the cells 10 within the stack, and the gases discharged from the cells 10 are discharged from the end. The flow of the gases becomes weaker at an end opposite the supply/discharge end than at the end having a supply/discharge port, and the cells in the vicinity of the end plates (end cells) are lower in temperature due to the influence of heat release and more likely to cause the liquidation of water than the cells in the vicinity of the center of the stack (central cells). As a result, water is biased.

Thus, in this embodiment of the invention, upon detecting the dispersion among the wet states of the respective cells, the ECU 90 comprehensively controls the flow rate of the coolant, the flow rates of the gases, and the pressures of the gases to suppress or eliminate the dispersion among the wet states.

Next, the contents of the control performed by the ECU 90 will be described.

Figure 3:
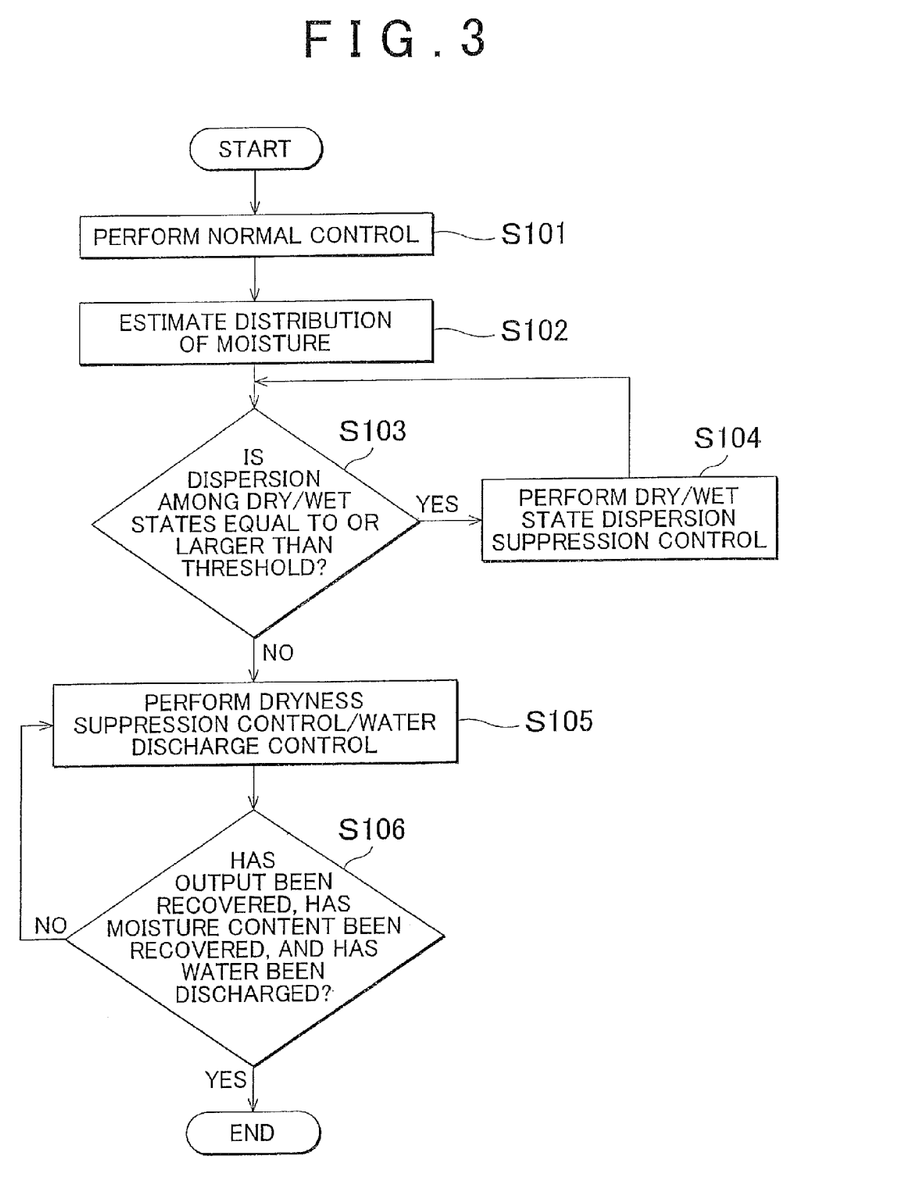
FIG. 3 is a processing flowchart of the embodiment of the invention.

FIG. 3 shows a flowchart of the control performed in this embodiment of the invention. In FIG. 3, the ECU 90 allows the oxidizing gas, the fuel gas, and the coolant to be supplied to the fuel cell 1 to perform the control for normal operation (S101). The ECU 90 then estimates wet states in the lamination direction of the stack of the fuel cell 1, namely, a water distribution at predetermined timings during the performance of the control for normal operation (an interrupt processing) (S102). This water distribution can be estimated according to any known method. For example, the ECU 90 calculates a difference between a voltage of one of the end cells of the stack and a voltage of a central cell of the stack. Then, when the difference between the voltages becomes equal to or larger than a predetermined threshold, the ECU 90 determines that the wet states are dispersed, namely, that water is biased (S103). In general, when the operation of the fuel cell 1 is started, the end cells and the central cell are wet and slightly dry respectively. As the fuel cell 1 continues to be operated, the water content of the central cell increases to cause an increase in generation efficiency. After that, the central cell becomes wet, and the water contents are gradually biased toward the end cells. As a result, the difference between the voltage of each of the end cells and the voltage of the central cell becomes equal to or higher than a predetermined voltage. It should be noted that if the fuel cell 1 continues to be operated in this state, the difference in voltage between the cells further increases and hence causes an inability to output power from a certain one of the cells or a decrease in output due to the occurrence of flooding.

When the difference in voltage is equal to or larger than the threshold and it is determined that the wet states are dispersed (the dry/wet states are dispersed) (YES in S103), the ECU 90 shifts to the control for suppressing the dispersion among the wet states (the dispersion among the dry/wet states) (S104). The ECU 90 performs this suppression processing until the difference in voltage becomes smaller than the threshold. Then, when the difference in voltage becomes smaller than the threshold (NO in S103), the ECU 90 performs dryness suppression control and water discharge control (S105) until the output of the fuel cell 1 is recovered, the water content is recovered, and water is discharged (S106).

A method of suppressing the dispersion among the wet states in S104 will be described hereinafter. First of all, a relationship between the coolant and the temperature will be examined. Among a current I of the fuel cell 1, a standard electromotive voltage V0, an actual electromotive voltage V, a coolant flow rate Qfcc, and a temperature T, there is a relationship: $I \cdot (V0-V) = k \cdot Gfcc \cdot dT/dt + \text{heat release}$. That is, the temperature T of the fuel cell 1 is a function of Qfcc, and there is a relationship: $T = f(Qfcc) \ldots (1)$.

On the other hand, an amount Qwat of water taken away by the gases is derived from a gas flow rate Qdry, a total gas pressure Pall, and a water vapor partial pressure Pwat according to a relationship: $Qwat = \{Pwat/(Pall-Pwat)\} \cdot Qdry \ldots (2)$.

Figure 4:
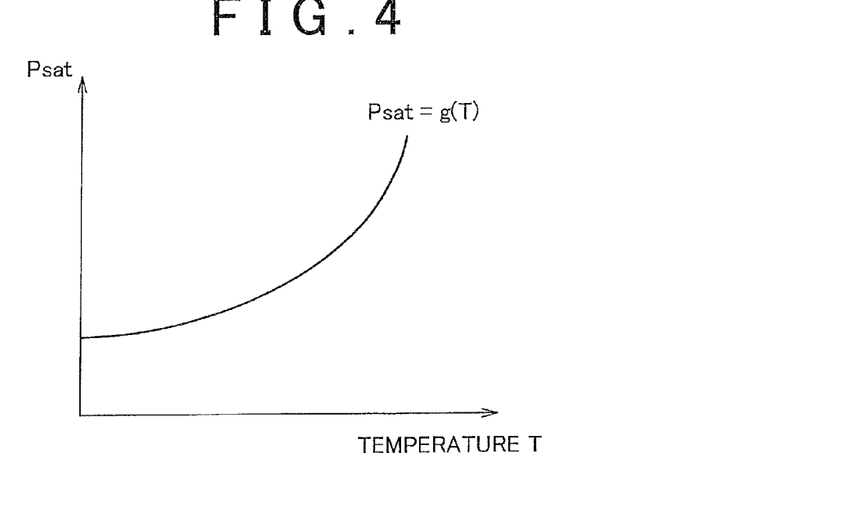
FIG. 4 is a graphic view showing a relationship between a temperature T and a saturated water vapor pressure.

Further, a saturated water vapor pressure Psat is determined depending on the temperature T as shown in FIG. 4, and hence can be defined as $Psat = g(T) \ldots (3)$. An expression: $Psat = h(Qfcc) \ldots (4)$ is obtained from the expressions (1) and (3), using a function h.

Further, among the saturated water vapor pressure Psat, the water vapor partial pressure Pwet, and a humidity (% RH), there is a relationship: $\% RH = (Pwet/Psat) \cdot 100 \ldots (5)$. Therefore, an expression: $Pwat = \% RH \cdot h(Qfcc)/100 \ldots (6)$ is obtained, using the expressions (2), (4), and (5).

Figure 5A:
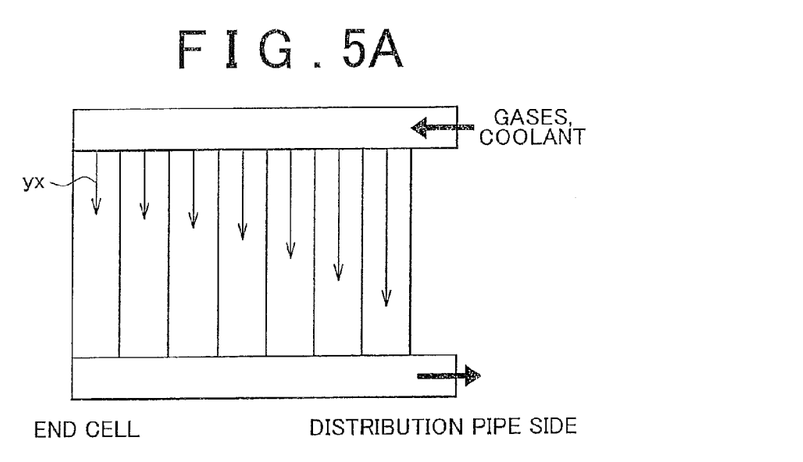
FIGS. 5A and 5B are explanatory views showing the dispersion of the distribution of a coolant and gases.
Figure 5B:
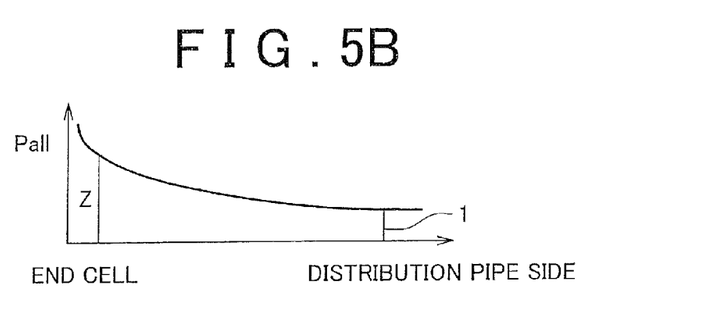

FIG. 5A schematically shows the distribution ratios of the gases and coolant supplied to the respective cells of the fuel cell. It is assumed in FIG. 5A that the gases and the coolant are supplied from an inlet on the right side and discharged from an outlet. In this case, the flow rates of the gases and the coolant are relatively high on the inlet side (on a distribution pipe side), and are relatively low on the other side, namely, on an end cell side. It is now assumed that relative flow rates of the gases and the coolant on the end cell side are denoted by x and y respectively (x<1, y<1) when the flow rate on the inlet side (on the distribution pipe side) is standardized as 1. Further, FIG. 5B shows a total gas pressure in the respective cells of the fuel cell. It is assumed that a relative gas pressure on the end cell side is denoted by z when the pressure on the inlet side (on the distribution pipe side) is standardized as 1. That is, given that the gas flow rate, the coolant flow rate, and the gas pressure on the distribution pipe side are denoted by Qdry, Qwat, and Pall respectively, the gas flow rate, the coolant flow rate, and the gas pressure on the end cell side are expressed as $x \cdot Qdry$, $y \cdot Qwat$, and $z \cdot Pall$ respectively. It should be noted herein that the values of (x, y, z) are obtained from the estimation of water distribution in S102.

In this case, as is apparent from the expressions (2) and (6), there is established a relationship: $Qwat = \{(\% RH \cdot h(y \cdot Qfcc)/100)/(z \cdot Pall - \% RH \cdot h(Qfcc)/100)\} \cdot x \cdot Qdry \ldots (7)$ on the end cell side, and there is established a relationship: $Qwat = (\% RH \cdot h(Qfcc)/100)/(Pall - \% RH \cdot h(Qfcc)/100) \ldots (8)$ on the distribution pipe side. Accordingly, the humidity % RH is expressed as $\% RH = (100\, Qwat \cdot z \cdot Pall)/((h(yQfcc) \cdot (x \cdot Qdry + Qwat)) \ldots (9)$ on the end cell side, and as $\% RH = (100\, Qwat \cdot Pall)/(h(Qfcc)(Qdry + Qwat)) \ldots (10)$ on the distribution pipe side. In order to suppress the dispersion among the wet states, it is appropriate to perform control such that the humidity on the distribution pipe side and the humidity on the end cell side become equal to each other. It is therefore appropriate to adjust the coolant flow rate Qfcc, the gas flow rate Qdry, and the gas pressure Pall such that the humidity % RH in the expression (9) and the humidity % RH in the expression (10) become equal to each other. Based on this principle, the ECU 90 adjusts the coolant flow rate Qfcc, the gas flow rate Qdry, and the gas pressure Pall on the basis of the estimated values of (x, y, z) such that the value in the expression (9) and the value in the expression (10) become equal to each other. That is, the ECU 90 adjusts the coolant flow rate Qfcc, the gas flow rate Qdry, and the gas pressure Pall in accordance with the values of (x, y, z) such that a relationship: $(100\, Qwat \cdot z \cdot Pall)/((h(yQfcc) \cdot (x \cdot Qdry + Qwat)) = (100\, Qwat \cdot Pall)/(h(Qfcc)(Qdry + Qwat)) \ldots (11)$ is established. The function h(Qfcc) is obtained in advance through an experiment and stored as a table or a function into a memory of the ECU 90.

Figure 6:
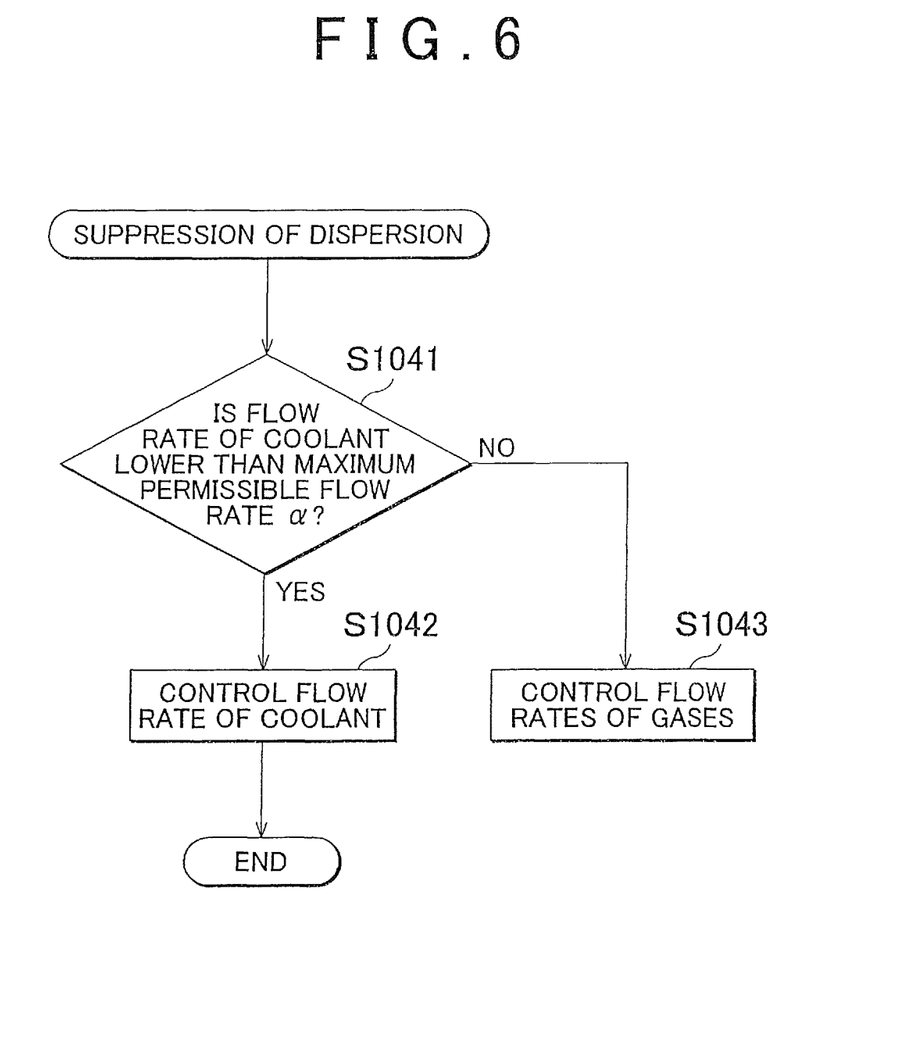
FIG. 6 is a flowchart showing an example of the suppression of dispersion.

A concrete example will be mentioned below. That is, when it is determined in S103 that the dispersion among the wet states is equal to or larger than the threshold, the ECU 90 first determines whether or not the current coolant flow rate Qfcc is lower than a maximum coolant flow rate α determined from a maximum rotational speed of a coolant pump as shown in FIG. 6 (S1041), so as to control the coolant flow rate Qfcc by priority. Then, when the current coolant flow rate Qfcc is lower than the maximum coolant flow rate α determined from the maximum rotational speed of the pump, the ECU 90 controls the coolant flow rate Qfcc (S1042), assuming that there is room for an increase in the coolant flow rate Qfcc. On the other hand, when the current coolant flow rate Qfcc has already reached the maximum coolant flow rate α determined from the maximum rotational speed of the pump, the ECU 90 controls another parameter, more specifically, the gas flow rate Qdry (S1043), because there is no room for the adjustment of the coolant flow rate Qfcc. In general, an air compressor suffers a smaller power loss than a coolant pump. It is therefore efficient to control the flow rate of the coolant pumped out from the coolant pump by priority as long as this coolant flow rate can be controlled.

Although the embodiment of the invention has been described above, the invention is not limited to this embodiment thereof. The invention can be subjected to various modifications.

For example, in this embodiment of the invention, any method can be adopted as the method of estimating the distribution of water in S102 of FIG. 3. However, the distribution of water may also be estimated by measuring current values of the respective cells laminated on one another or by measuring resistance values of the respective cells.

Further, in this embodiment of the invention, the ECU 90 may control all the parameters, namely, the coolant flow rate Qfcc, the gas flow rate Qdry, and the gas pressure Pall, or may control at least one of the gas flow rate and the gas pressure as well as the coolant flow rate Qfcc. Further, the ECU 90 may set an order of priority for the coolant flow rate Qfcc, the gas flow rate Qdry, and the gas pressure Pall, and perform control in accordance with this order of priority. It is preferable to control the coolant flow rate Qfcc first and then control the gas flow rate Qdry or the gas pressure Pall. In this sense, the ECU 90 can be said to suppress the dispersion among wet states by controlling at least the coolant flow rate Qfcc. The coolant is an example of a coolant medium. Therefore, the ECU 90 can be said to suppress the dispersion among wet states by controlling at least a cooling medium flow rate Qfcc.

Further, in this embodiment of the invention, as shown in the processing flowchart of FIG. 3, the dispersion among the wet states is suppressed through combination with a mechanism for controlling the balance of water in the stack (the processings of S105 and S106). However, it is also possible to control the wet states by repeatedly performing the processing of S104 without performing the processings of S105 and S106.

Furthermore, in this embodiment of the invention, the flow rate of the coolant and the like are basically controlled such that the expression (11) is established. However, it is also appropriate to use an expression other than the expression (11). Alternatively, it is also appropriate to perform the control of increasing the coolant flow rate by a predetermined amount and monitor the dispersion among the wet states every time the dispersion among the wet states becomes equal to or larger than the threshold, and perform the control of repeatedly performing the control of increasing the amount of the coolant until the dispersion among the wet states becomes smaller than the threshold. In short, when the dispersion among the wet states is detected, it is appropriate to control the coolant flow rate with priority until this dispersion decreases to a permissible range.

While the invention has been described with reference to the example embodiment thereof, it is to be understood that the invention is not limited to the described embodiment or construction. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell system comprising:
    a fuel cell that generates electricity through an electrochemical reaction between a fuel gas and an oxidizing gas and is constituted by a laminated stack of unit cells;
    detection means for detecting a dispersion among wet states of the unit cells arranged in a lamination direction of the unit cells; and
    control means for suppressing the dispersion among the wet states by controlling a flow rate of a cooling medium for cooling the unit cells when the dispersion among the wet states is equal to or exceeds a threshold, wherein
    the control means further controls at least one of gas flow rates of the fuel gas and the oxidizing gas and gas pressures of the fuel gas and the oxidizing gas, and where
    the control means sets an order of priority for the flow rate of a cooling medium, the gas flow rates and the gas pressures and control is performed in accordance with this order of priority by first controlling the flow rate of the cooling medium and then controlling the gas flow rates and/or the gas pressures.

2. The fuel cell system according to claim 1, wherein the control means performs control such that a humidity of that one of the unit cells arranged in the lamination direction of the unit cells which is located on an inlet side of the fuel gas, the oxidizing gas, and the cooling medium and a humidity of an end cell located opposite that cell on the inlet side become equal to each other.

3. A fuel cell system comprising:
    a fuel cell that generates electricity through an electrochemical reaction between a fuel gas and an oxidizing gas and is constituted by a laminated stack of unit cells;
    a detection portion that detects a dispersion among wet states of the unit cells arranged in a lamination direction of the unit cells; and
    a control device that suppresses the dispersion among the wet states by controlling a flow rate of a cooling medium for cooling the unit cells when the dispersion among the wet states is equal to exceed a threshold,
    wherein the control device further controls at least one of gas flow rates of the fuel gas and the oxidizing gas and gas pressures of the fuel gas and the oxidizing gas, and where
    the control device sets an order of priority for the flow rate of a cooling medium, the gas flow rates and the gas pressures and control is performed in accordance with this order of priority by first controlling the flow rate of the cooling medium and then controlling the gas flow rates and/or the gas pressures.

4. A control method for a fuel cell system equipped with a fuel cell that generates electricity through an electrochemical reaction between a fuel gas and an oxidizing gas and is constituted by a laminated stack of unit cells, comprising:
    (a) detecting a dispersion among wet states of the unit cells arranged in a lamination direction of the unit cells; and
    (b) suppressing the dispersion among the wet states by controlling a flow rate of a cooling medium for cooling the unit cells when the dispersion among the wet states is equal to or exceeds a threshold, wherein
    the step (b) is repeatedly carried out until the dispersion among the wet states becomes smaller than the threshold, and wherein
    the step (b) further includes controlling at least one of gas flow rates of the fuel gas and the oxidizing gas and gas pressures of the fuel gas and the oxidizing gas, wherein an order of priority is set for the flow rate of a cooling medium, the gas flow rates and the gas pressures and control is performed in accordance with this order of priority by first controlling the flow rate of the cooling medium and then controlling the gas flow rates and/or the gas pressures.

5. The control method according to claim 4, wherein the step (b) includes (b1) determining whether or not a current flow rate of the cooling medium is lower than a maximum permissible flow rate, and (b2) controlling the flow rate of the cooling medium when it is determined that the current flow rate of the cooling medium is lower than the maximum permissible flow rate and controlling at least one of gas flow rates of the fuel gas and the oxidizing gas and gas pressures of the fuel gas and the oxidizing gas when it is determined that the current flow rate of the cooling medium has reached the maximum permissible flow rate.

6. The control method according to claim 5, wherein the step (b) includes performing control such that a humidity of that one of the cells arranged in the lamination direction of the unit cells which is located on an inlet side of the fuel gas, the oxidizing gas, and the cooling medium and a humidity of an end cell located opposite that cell on the inlet side become equal to each other.

7. The control method according to claim 4, wherein the step (b) includes performing control such that a humidity of that one of the cells arranged in the lamination direction of the unit cells which is located on an inlet side of the fuel gas, the oxidizing gas, and the cooling medium and a humidity of an end cell located opposite that cell on the inlet side become equal to each other.

* * * * *